(12) United States Patent
Carter et al.

(10) Patent No.: US 10,782,075 B2
(45) Date of Patent: Sep. 22, 2020

(54) CATALYST HEAT REMOVAL CLUSTER AND TUBE DESIGN

(71) Applicant: Technip Process Technology, Inc., Houston, TX (US)

(72) Inventors: Millard Alamath Carter, Katy, TX (US); Andrew Kennedy Camille, Missouri City, TX (US); Kenneth Fewel, Houston, TX (US); Remus Ciobotaru, Richmond, TX (US); Bhumil Diwanji, Richmond, TX (US)

(73) Assignee: Technip Process Technology, Inc., Houston, TX (US)

(*) Notice: Subject to any disclaimer, the term of this patent is extended or adjusted under 35 U.S.C. 154(b) by 359 days.

(21) Appl. No.: 15/642,912

(22) Filed: Jul. 6, 2017

(65) Prior Publication Data
US 2019/0011195 A1    Jan. 10, 2019

(51) Int. Cl.
| | |
|---|---|
| *F28D 15/00* | (2006.01) |
| *B01J 8/00* | (2006.01) |
| *B01J 8/18* | (2006.01) |
| *B01J 8/08* | (2006.01) |
| *B01J 8/12* | (2006.01) |
| *C10G 11/18* | (2006.01) |

(52) U.S. Cl.
CPC .............. *F28D 15/00* (2013.01); *B01J 8/001* (2013.01); *B01J 8/087* (2013.01); *B01J 8/12* (2013.01); *B01J 8/1836* (2013.01); *C10G 11/182* (2013.01); *C10G 11/185* (2013.01); *B01J 2208/00132* (2013.01); *B01J 2208/00256* (2013.01); *C10G 2300/4006* (2013.01); *C10G 2300/708* (2013.01)

(58) Field of Classification Search
CPC .. F28D 15/00; B01J 8/001; B01J 2208/00256
USPC .......................................................... 502/44
See application file for complete search history.

(56) References Cited

U.S. PATENT DOCUMENTS

| | | |
|---|---|---|
| 4,009,121 A | 2/1977 | Luckenbach |
| 4,220,622 A | 9/1980 | Kelley |
| 4,343,634 A | 8/1982 | Davis |
| 4,388,218 A | 6/1983 | Rowe |
| 5,242,012 A | 9/1993 | Lai et al. |
| 5,351,749 A | 10/1994 | Lai et al. |
| 5,571,482 A | 11/1996 | Long et al. |
| 7,273,543 B2 | 9/2007 | Letzsch |
| 10,377,955 B2 | 8/2019 | Le Coz et al. |
| 2005/0029163 A1 | 2/2005 | Letzsch |
| 2016/0074825 A1 | 3/2016 | Umar et al. |

OTHER PUBLICATIONS

PCT International Search Report and Written Opinion dated Sep. 7, 2018, issued during the prosecution of corresponding PCT International Application No. PCT/US2018/040960 (15 pages).

*Primary Examiner* — Edward M Johnson
(74) *Attorney, Agent, or Firm* — Locke Lord LLP; Peter J. Fallon; Alicia J. Carroll (57) ABSTRACT

An external catalyst cooler arrangement for an FCC regenerator improves the operation of the catalyst cooler by the use of a heat removal unit design utilizing a central supply tube and central heat removal conduit surrounded by external heat removal tubes connected directly to the central heat removal conduit.

12 Claims, 8 Drawing Sheets
(2 of 8 Drawing Sheet(s) Filed in Color)

CATALYST HEAT REMOVAL CLUSTER AND TUBE DESIGN

FIELD OF THE INVENTION

This invention relates generally to the fluidized catalytic cracking of hydrocarbons. More specifically this invention relates to an external catalyst cooler vessel for the cooling of catalyst in FCC processes.

DESCRIPTION OF THE RELATED ART

Fluidized catalytic cracking (FCC) processes are widely used for the conversion of hydrocarbon feed streams such as vacuum gas oils and other relatively heavy oils into lighter and more valuable hydrocarbon products. The FCC process utilizes a finely divided particulate catalyst fluidized by a gas or vapor for contact with the starting hydrocarbon feed stream, also in a fluidized form. As the particulate catalyst proceeds in the reaction its catalytic sites are covered by coke, a by-product of the reaction, deposited on the surface of the catalyst particles which inhibits the catalytic activity. A catalyst regenerator is used to burn the coke off of the catalyst for regeneration and reuse of the catalyst in the cracking process.

Burning of the coke from the spent catalyst generates large amounts of heat which is utilized at least in part to supply the heat necessary for the endothermic cracking reaction taking place in the reactor. As the hydrocarbon feeds become heavier, i.e. have higher Conradson Carbon values, the amount of coke by-product developed on the catalyst in the catalytic reaction increases. Therefore, the use of heavier feeds can lead to excess heat generated during catalyst regeneration due to the burning of larger amounts of coke developed on the catalyst.

The additional heat can create a number of problems in the FCC process, including upsetting the heat balance, requiring limitation of hot catalyst fed to the reaction resulting in lower yields, and damaging the equipment or catalyst. Therefore, it is beneficial to have a means to lower the catalyst temperature during regeneration if the heat balance is exceeded.

Various methods of removing heat during regeneration have been tried, however, heat exchange through indirect contact with a cooling medium has been most widely adopted. Generally, indirect contact heat exchange is achieved using cooling coils or tubes, through which a cooling fluid is passed. The cooling coils can run through a bed of the catalyst particles internal to the regenerator or through a separate catalyst bed external to the regenerator.

Heat exchangers utilizing cooling coils or tubes running through a fluidized catalyst particle bed internal to the regenerator are illustratively shown in U.S. Pat. No. 4,009,121 to Luckenbach, U.S. Pat. No. 4,220,622 to Kelley, U.S. Pat. No. 4,388,218 to Rowe and U.S. Pat. No. 4,343,634 to Davis. Internal heat exchangers, however, are difficult to retrofit and/or service.

External heat exchangers are generally flow-through coolers where catalyst is withdrawn from the regenerator and directed into a separate vessel having cooling tubes or coils therein. One type of external cooler is a "flow-through," another type is a "back-mix" cooler. Generally, flow-through coolers are either gravity feed, where catalyst enters one upper inlet and exits a lower outlet, or fluidized transport which moves catalyst from a lower inlet past the cooling coils to an upper outlet. Back-mix coolers utilize a common catalyst inlet and outlet to move the catalyst from the hot catalyst source to the heat exchanger and back.

Prior art external heat exchangers include U.S. Pat. No. 5,242,012, which discloses an apparatus and process for cooling hot fluid solid particles, especially hot regenerated catalytic particles are disclosed. The apparatus comprises a substantially vertical, cylindrical and close ended heat removal vessel and through the shell side fluid solid particles flow downwardly in the form of dense phase fluidized bed. The vessel contains one or more separate heat exchange tube units, wherein coolant is passed tube side through an inlet and vaporized. The separate heat exchange tube unit further contains a supply coolant collecting chamber, one or more heat exchange tubes, a vapor collecting chamber and a resulting vapor discharge tube. U.S. Pat. No. 7,273,543 discloses a process and an apparatus for catalytic cracking a hydrocarbon feed to lighter hydrocarbon employing an external catalyst cooler in flow communication with a catalyst stripper. Similarly, U.S. Pat. No. 5,571,482 discloses an external catalyst cooler apparatus and process for use with a two-stage regeneration system in a fluidized catalytic cracking process. The apparatus has a device to remove hot catalyst from the second regeneration zone at a point above the air distribution ring under the surface of the catalyst bed equivalent to the catalyst exit to the reactor, a heat exchanger for indirect heat exchange and cooling of the catalyst and a return device for returning the cooled catalyst to the second regeneration zone at or near the bottom of the catalyst bed, beneath the air distribution ring.

As such, the inventors have discovered an improved heat exchange arrangement of the apparatus for the removal of a portion of thermal energy from hot regenerated catalyst particles in FCC processes.

SUMMARY OF THE INVENTION

An embodiment is directed to an FCC external catalyst cooling vessel comprising: (i) a substantially vertical, cylindrical catalyst cooler vessel having a vessel wall, at least one catalyst inlet and catalyst outlet, and at least one gas inlet and gas outlet; (ii) at least one heat removal unit being housed in the catalyst cooler vessel, the at least one heat removal unit comprising a central supply tube sheathed in a coaxial manner by a central heat removal conduit to provide a flow area between the exterior surface of the central supply tube and the interior surface of the central heat removal conduit, the central supply tube and central heat removal conduit extend through a top portion of the vessel wall, the central supply tube having coolant inlet external to the vessel that is not sheathed by the central heat removal conduit and a coolant outlet at an end of the central supply tube that is opposite the coolant inlet and proximate to a bottom chamber of the central heat removal conduit, the central heat removal conduit having a vapor outlet external to the vessel and below the coolant inlet; and (iii) the heat removal unit further comprising at least one external heat removal tube, the external heat removal tube being in fluid communication with the central heat removal conduit at a conduit bottom area proximate to the bottom chamber and above the central supply tube coolant outlet and a conduit top area distal to the bottom chamber of the heat removal unit and below the top portion of the vessel wall.

Another embodiment of the catalyst cooling vessel provides the central supply tube with vertical baffles that are arranged around the central supply tube near to the coolant outlet and extending along the central supply tube distal to the conduit bottom area and passes where the external heat removal tubes interface in fluid communication with the central heat removal conduit. A further embodiment provides a restriction ring that extends around the central supply tube and is integral to the vertical baffles.

Figure 2:
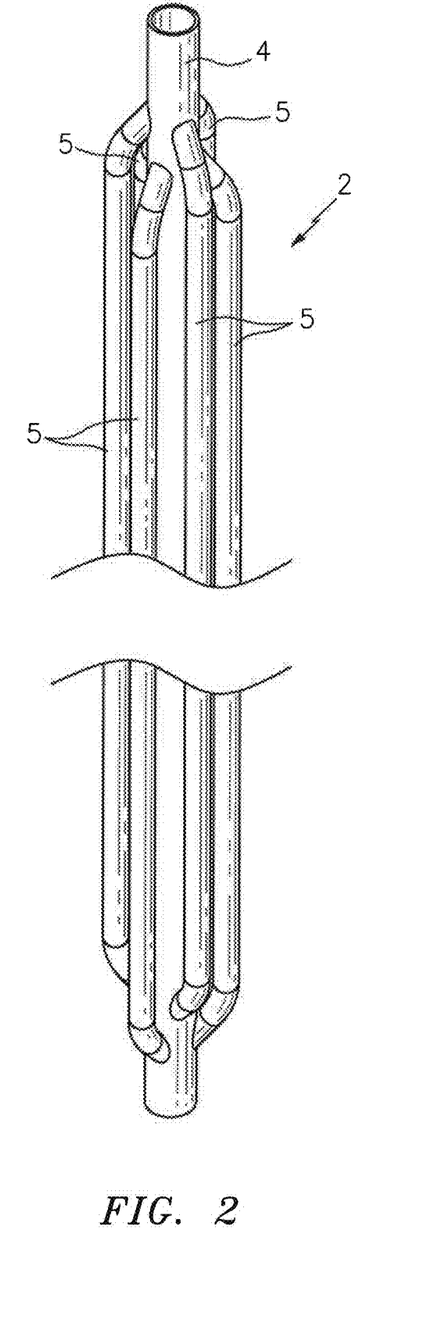
FIG. 2 is a perspective side view of an embodiment of a heat removal unit of an external catalyst cooler vessel disclosed herein.

Additional embodiments provide that the heat removal units comprise at least 3, or at least 6 or more external heat removal tubes that are substantially equally spaced axially about the central heat removal conduit, and in the case of the 6 external heat removal tubes, they are staggered (see, for example, FIG. 2). The geometry of the heat removal units allows them to be arranged in a triangular pattern, which provides the benefit of less channeling of catalyst through open area between the shell and the heat removal units resulting in a more uniform contact of the tubes with catalyst flow. An embodiment provides that the external heat removal tubes interface, i.e., in fluid communication, with the central heat removal conduit at an angle of about 90 degrees or less, and preferably at an angle of 45 degrees or less.

Other embodiments provide the coolant inlet, vapor outlet, catalyst inlet, catalyst outlet, and gas inlet and outlet with control valves. Still further embodiments provide for the gas inlet being in fluid communication with a gas distributor located at an area with the vessel that is below the heat removal units and the gas outlet extends through the top portion of the vessel wall.

Yet another embodiment of the invention is directed to a process for control the temperature of a regenerated catalyst from an FCC regenerator comprising the step of providing regenerated catalyst from the FCC regenerator to the external catalyst cooling apparatus disclosed herein.

The embodiments of the external catalyst cooler vessel disclosed herein provide increased surface area per each heat removal unit, or heat removal cluster. Thus, the external catalyst cooler vessel diameter can be reduced by about 25-30 percent for a similar duty or the duty can be increased by 50-100 percent in a similar sized external catalyst cooler vessel. See for example, FIGS. 3 and 4.

The disclosed external catalyst cooler vessel requires about 30 percent few parts than those of the prior art because of the elimination of top and bottom horizontal headers (manifolds) and fewer heat removal units per external catalyst cooler vessel, thus reducing the manufacturing cost. See for example FIGS. 1 and 2, which provide for a detailed comparison of heat removal units (or heat removal cluster) headers.

Additionally, the disclosed embodiments of the external catalyst cooler vessel require a significant reduction in the amount of welding required to assemble the reduced number of parts.

Amount of refractory, both material and installation labor, is reduced significantly due to the elimination of the horizontal headers (manifolds) discussed above.

Further, the disclosed embodiments provide improved catalyst distribution and uniformity of contact with the heat removal units due to the ability of heat removal cluster to be positioned within the external catalyst cooler vessel on a triangular pitch to reduce unwanted shell side bypass (i.e., reduces catalyst avoidance of contact with the heat removal units), thus improving heat transfer by improving contact with the tubes.

Furthermore, the internal devices, e.g., vertical baffles and restriction ring on the central supply tube in the conduit bottom area, provide uniform flow distribution of the coolant, e.g., water, to all external heat removal tubes and the flow area between the central supply tube and central heat removal conduit, for even heat transfer distribution.

BRIEF DESCRIPTION OF THE DRAWINGS

There are ten figures attached to the present specification, which figures are as follows. Additionally, the patent application file contains at least one drawing executed in color. Copies of this patent or patent application publication with color drawings will be provided by the Office upon request and payment of the necessary fee.

DETAILED DESCRIPTION OF THE INVENTION

The external catalyst cooler vessel and method disclosed herein may utilize as many heat removal units, or heat removal clusters independent of one another as required for the maintenance of thermal equilibrium or a constant operation temperature of the catalyst during the regeneration cycle of the fluid catalytic cracking (FCC) process. Thus, the external catalyst cooler vessel and method thereof are particularly suitable to an FCC operation. In an embodiment of the present disclosure, the high temperature regenerated catalytic particles are introduced through an opening at the upper portion of the external catalyst cooler vessel and fluid-like flow downwardly through the external catalyst cooler vessel in the form of fluidized dense phase bed which is caused by a fluidizing gas introduced through a gas inlet opening in the lower portion of the vessel. These catalyst particles are cooled and then discharged through a catalyst outlet opening at the lower portion of the external catalyst cooler vessel. The catalyst inlet and outlet conduits are provided with slide valves which function to control the thermal loading of the external catalyst cooler vessel system within a range of from 0% to 100%. The heat exchange medium or coolant, preferably water is passed through the central supply tubes of as many heat removal units as the heat removal load requires and at the same time the supply water is vaporized into steam during the absorption of a portion of thermal energy from the hot regenerated catalyst particles by indirect heat exchange. The formed steam is discharged through a vapor outlet associated with the central heat conduit of each heat removal unit.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Apart from the unique heat removal units disclosed herein and their associations, other parts may be in the conventional forms or provided by the modifications thereof which will be apparent to those skilled in the art. The number of heat removal units to be employed depends on the quantity of thermal energy to be removed or recovered from the hot regenerated catalytic particles.

Figure 1:
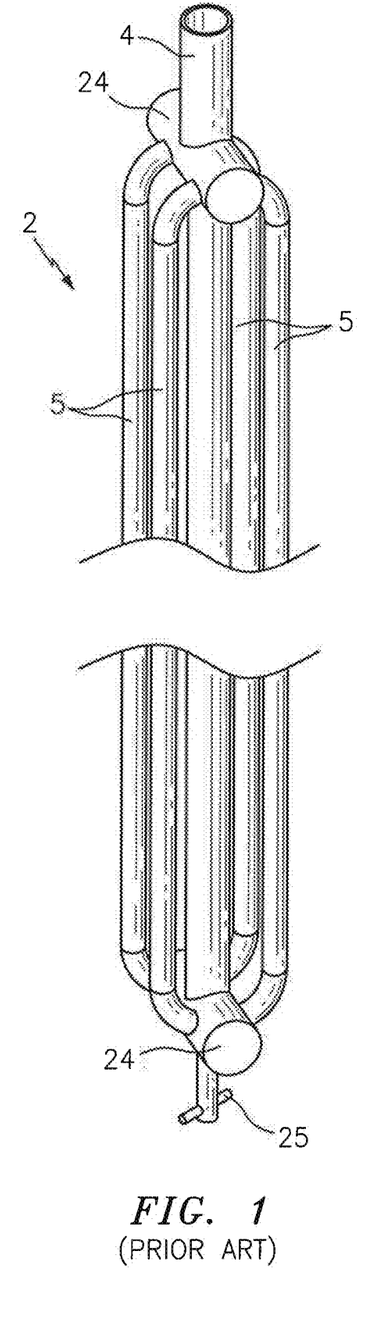
FIG. 1 is a perspective side view of a prior art heat removal unit of an external catalyst cooler vessel.

FIG. 1 presents a prior art catalyst cooler heat removal unit (2) (or heat removal cluster) having a square array of 4 branch external heat removal tubes (5) connected to headers (24) (manifolds) and a central heat removal conduit (4). The catalyst cooler heat removal unit (2) of FIG. 1 further comprises a guide pin (25) for setting the unit in external catalyst cooler vessel (not shown). When FIG. 1 is compared to the embodiment of FIG. 2, it will be noted that heat removal unit (2) is a "headerless" heat removal unit (2) having 6 external heat removal tubes (5) and a central heat removal conduit (4) for use in an external catalyst cooler vessel.

Figure 3:
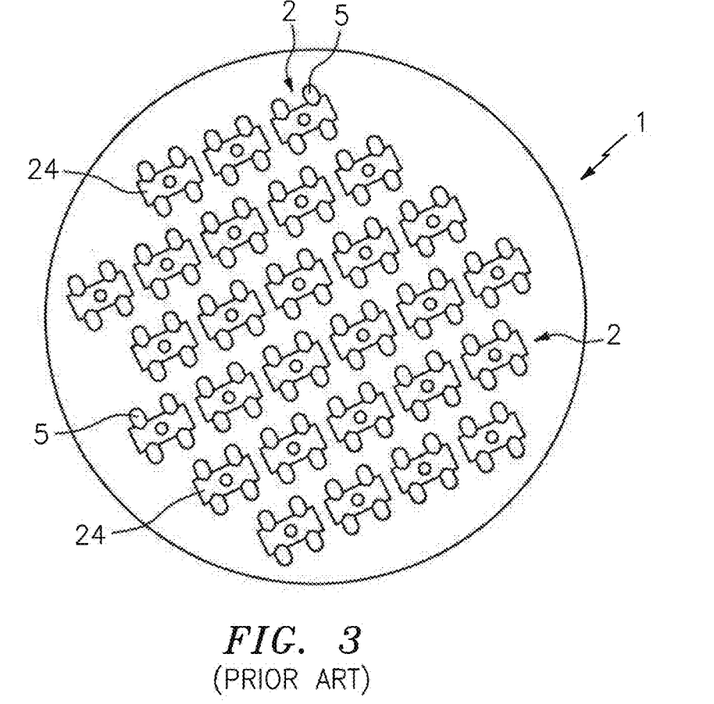
FIG. 3 is a top perspective view of multiple prior art heat removal units within an external heat removal vessel know as an external catalyst cooler.
Figure 4:
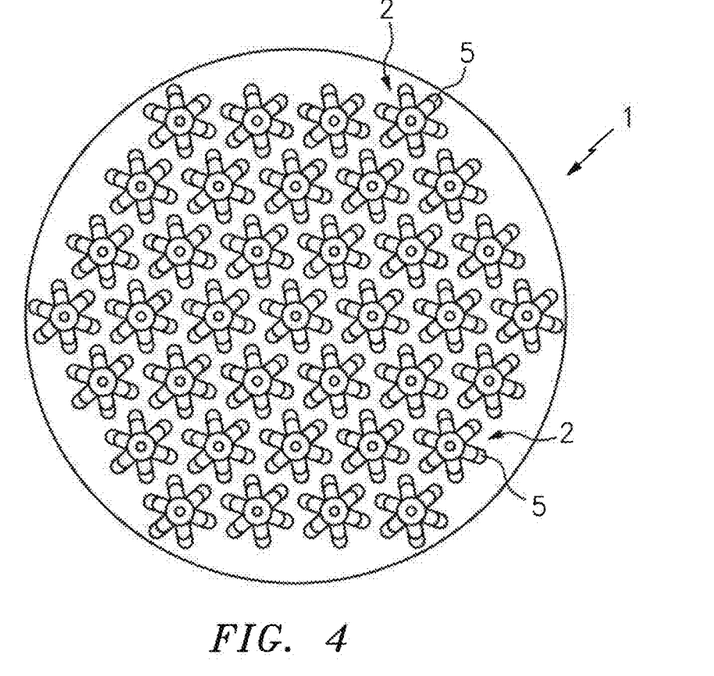
FIG. 4 is a top perspective view of an embodiment of multiple heat removal units within an external heat removal vessel disclosed herein.

FIG. 3 and FIG. 4 present a top view comparison of heat removal units (2) in external catalyst cooler vessels (1) having the same vessel diameter. FIG. 3 shows the vessel containing 28 prior art heat removal units having a 4 branch external heat removal tube (5) design, while FIG. 4 indicates that the same external catalyst cooler (1) diameter vessel can contain at least 37 headerless heat removal units (2) having a 6 external heat removal tube (5) design. As can be seen in FIG. 4 the new heat removal unit (2) arrangement benefits from less open area resulting more uniform contact of the catalyst with the surfaces of the heat removal units (2).

Figure 5:
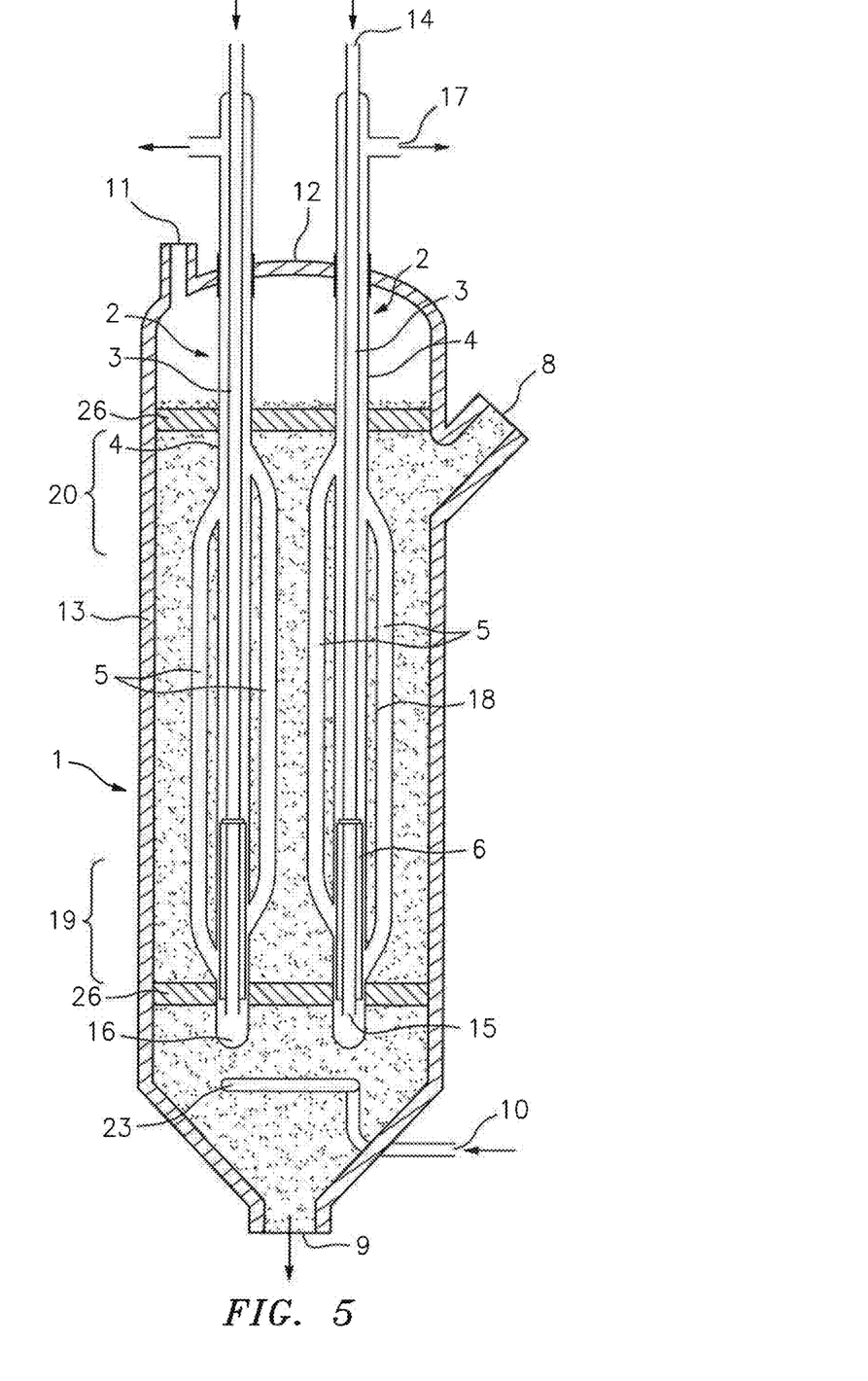
FIG. 5 is a vertical perspective cross sectional view of the heat removal unit within an external catalytic cooler vessel disclosed herein.

FIG. 5 presents an FCC external catalyst cooler vessel (1) that is substantially vertical and cylindrical in shape. The external catalyst cooler vessel (1) is comprised of a vessel wall (13), and at least one catalyst inlet (8) and at least on catalyst outlet (9). Further the external catalyst cooler vessel (I) has at least one gas inlet (10) and at least one gas outlet (11), and the one gas inlet (10) being in fluid communication with a gas distributor (23) within the external catalyst cooler vessel (1)

In FIG. 5 the heat removal units (2) are contained or housed within the external catalyst cooler vessel (1). The heat removal unit (2) comprises a central supply tube (3) that is located within the central heat removal conduit (4). The central supply tube (3) and central heat removal conduit (4) are coaxial to one another, e.g., a pipe within a pipe, so that there is a flow area (18) created between the exterior surface of the central supply tube (3) and the interior surface of the central heat removal conduit (4). The flow area (18) between them that allows for the passage and removal of the heated coolant from the heat removal unit (2). The central supply tube (3) and central heat removal conduit (4) extend through a top portion of the external catalyst cooler vessel's wall (13). Further the central heat removal conduit (4) encloses or sheathes the central supply tube (3) on the exterior side of the catalyst cooler vessel (1) to a point that is below the central supply tube's (3) coolant inlet (14). The coolant inlet (14) is substantially an extension of the central supply tube (3) that extends beyond the encapsulating central heat removal conduit (4) external to the catalyst cooler vessel (1). The central supply tube (3) has a coolant outlet (15) at an end of the central supply tube (3) that is opposite the coolant inlet (14). The coolant outlet (15) opens into the bottom chamber (16) of the central heat removal conduit (4), which is merely the closed end of the central heat removal conduit (4), whereby the coolant leaves the central supply tube (3) through the coolant outlet (15) into the bottom chamber (16) and reverses flow direction and moves upward into the flow area (18) as is becomes heated and changes to a vapor state. The central heat removal conduit (4) also has at least one vapor outlet (17) external to the catalyst cooler vessel (1) and it is located below the coolant inlet (14).

In FIG. 5 the heat removal unit (2) additionally has at least one external heat removal tube (5) or more preferably has 3 or 6 or more external heat removal tubes (5) that are positioned in fluid communication with the central heat removal conduit (4). The external heat removal tubes (5) are connected or joined to the central heat removal conduit (4) in a "headerless" manner, so that the coolant can flow from the bottom chamber (16) up into the external heat removal tubes (5) and back into the flow area (18) between the central supply tube (3) and the central heat removal conduit (4) and exit the heat removal unit (2) through the vapor outlet (17). Specifically, the external heat removal tube (5) connects in fluid communication with the central heat removal conduit (4) at a conduit bottom area (19) that is proximate or above the bottom chamber (16) and above the central supply tube's (3) coolant outlet (15) and at a conduit top area (20) that is distal to the bottom chamber (16) and below the top portion (12) of the vessel wall (13). In this manner the coolant is passed down into the central supply tube (3) and leaves the central supply tube (3) via the coolant outlet (15) into the central heat removal conduit's (4) bottom chamber (16) and flows into the external heat removal tubes (5) and the flow area (18) to be uniformly distributed within the heat removal unit (2). Further, in FIG. 5 the heat removal units (2) are held into position within the external catalyst cooler vessel (1) by guide plates (26) that maintain the position of the units (2) and advantageous provide for passage of the catalyst and gas therein, where needed. The guide plates (26) can be made of materials and designs that are known and conventional in the art.

In FIG. 5 the central supply tube (3) of heat removal unit (2) may further contain at least one vertical baffle (6) that is located above the coolant outlet (15) and extends along the central supply tube (3) to an area above where the external heat removal tube (5) connects in fluid communication with the central heat removal conduit (4) at the conduit bottom area (19). The central supply tube (3) may also have a restriction that extends around the central supply tube, the restriction being a continuous ring piece or separate pieces, porous, perforated, solid or formed from a swaged portion of the central heat removal conduit or central supply tube, referred to herein as restriction ring (7) (see, FIG. 6 and FIG. 7) that extends around the central supply tube (3) and is connected to or is integral with the vertical baffles (6). The vertical baffles (6) and restriction ring (7) are distribution devices that provide for balance in the flow-through of the coolant.

When the external heat removal tube (5) are placed in fluid communication with the central heat removal conduit (4) they are placed at an angle of about 90° or less, or preferably at about 45° or less to improve the special relationship between the heat removal units (2) of the external catalyst cooler vessel (1). Moreover, the external heat removal tubes (5) are evenly spaced, e.g., triangulated, around central heat removal conduit (4), and if necessary due to the number of external removal tubes (5) per each heat removal unit, they can be staggered or alternated in and up and down fashion to provide for an efficient spacing of the heat removal units (2).

The external catalyst cooling vessel (1) is further contemplated to have control valves on coolant inlet, vapor outlet, so that each heat removal unit (2) can be isolated if necessary without effecting the other each heat removal units (2) within the external catalyst cooling vessel (1).

Figure 6:
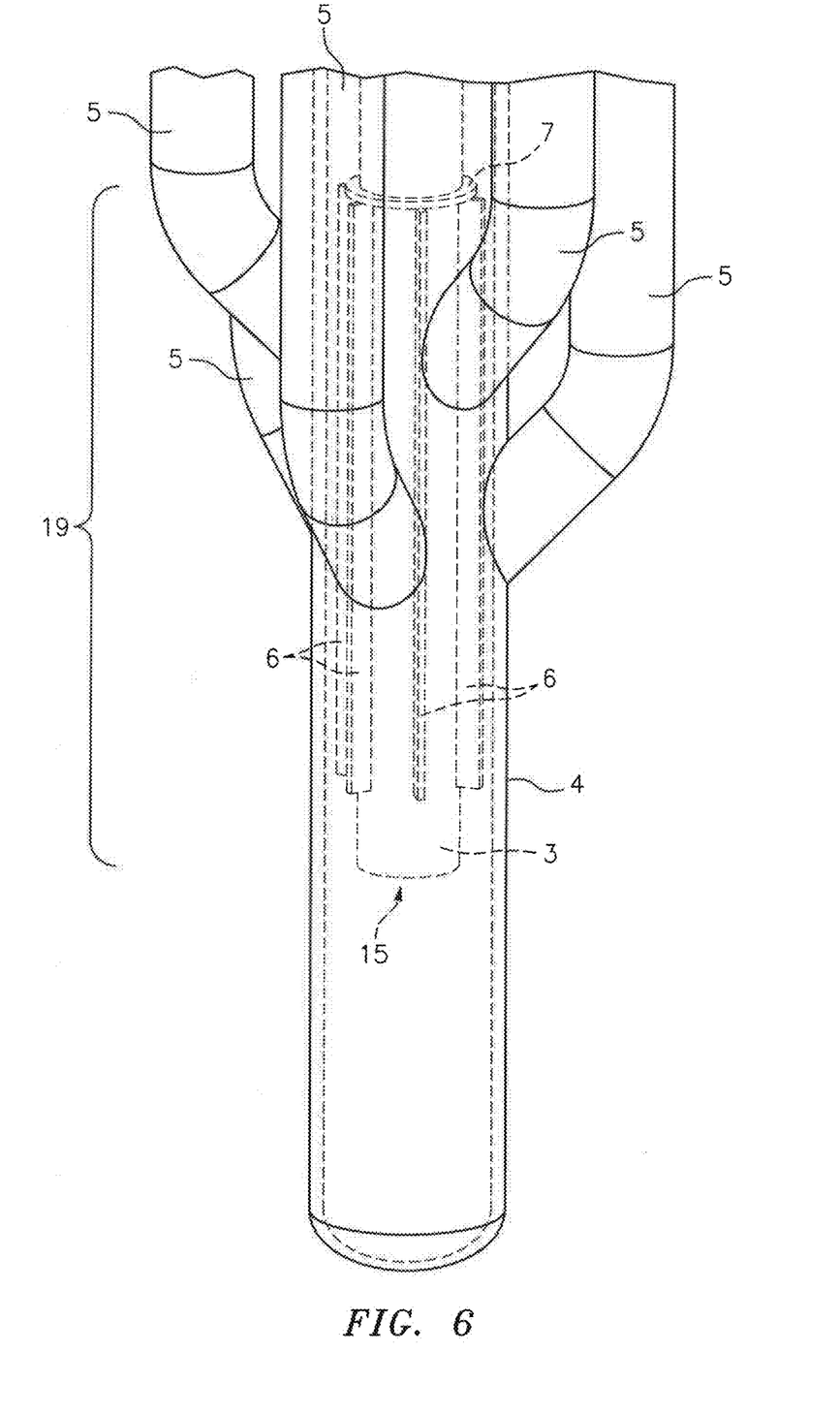
FIG. 6 is a vertical perspective view of the heat removal unit disclosed herein.
Figure 7:
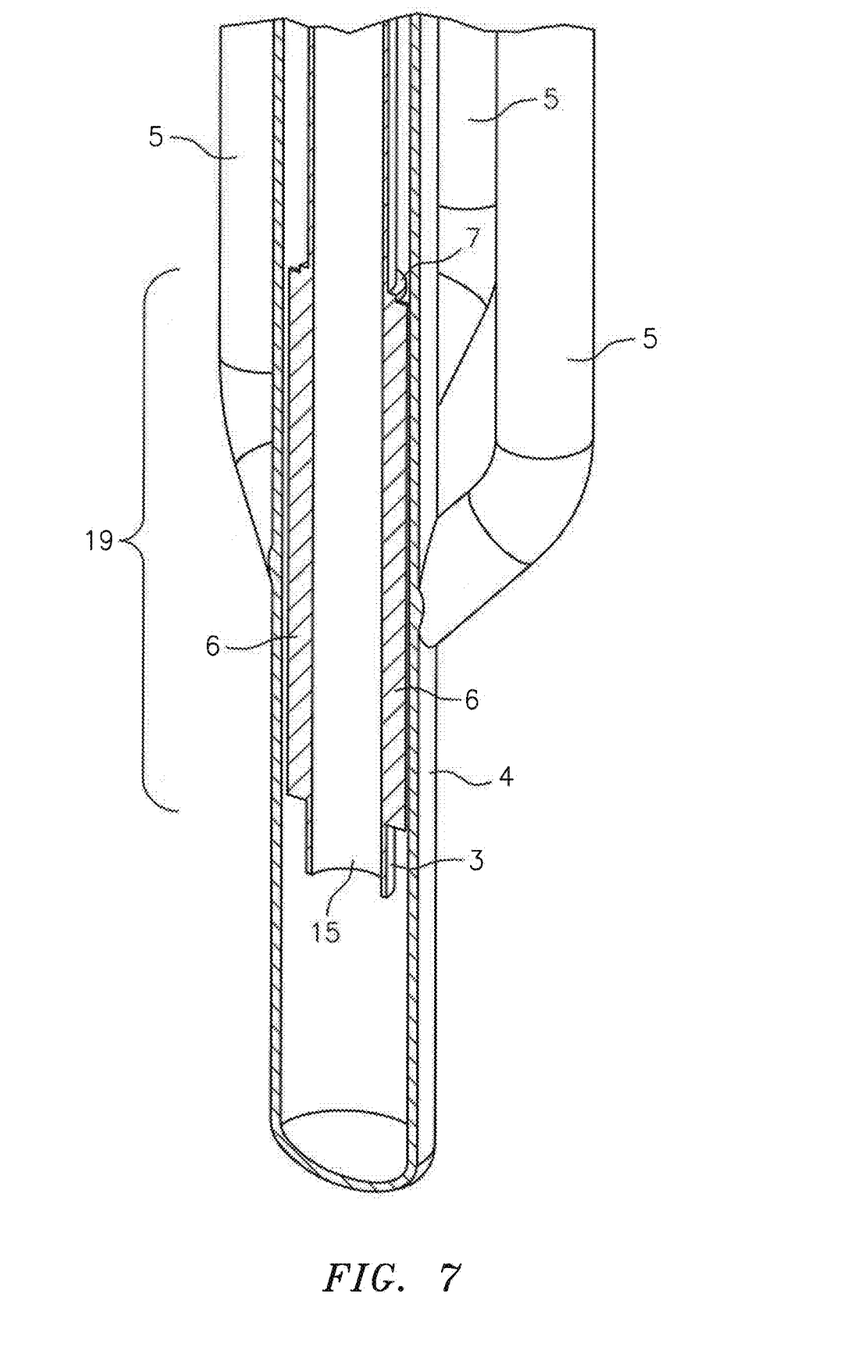
FIG. 7 is a perspective cross-sectional view of the heat removal unit disclosed herein.

Further, FIG. 6 is a close-up view of heat removal unit's (2) conduit bottom area (19), wherein the vertical baffles (6) are located above the coolant outlet (15) and extend above the external heat removal tube (5) connection to the central heat removal conduit (4). A restriction ring (7) extends around the central supply tube (3) and is connected to the vertical baffles (6). Specifically, the conduit bottom area (19) is the area where the vertical baffles (6), restriction ring (7) and connection of the external heat removal tubes (5) meet in order to provide an even distribution and flow of coolant. Furthermore, FIG. 7 is a cross-sectional close-up view of heat removal unit's (2) conduit bottom area (19), wherein the vertical baffles (6) and restriction ring (7) are located above the coolant outlet (15) and extend above external heat removal tube (5) connection point to the central heat removal conduit (4).

To show the improved distribution of fluid within the heat removal unit of the claimed external catalyst cooling vessel, and specifically the improved deviation from optimal distribution within the heat removal units, color computational fluid dynamics (CFD) simulations were prepared, the results of which are presented FIGS. 8A, 8B, 9A, and 9B. The computational fluid dynamics simulations present non-dimensional velocity based on the average velocity of the central supply tube (3) coolant outlet (15). All of the non-dimensional velocities were computed by dividing the local velocity, i.e., the non-dimensional vertical velocity presented in FIGS. 8A and 8B, and non-dimensional velocity magnitude presented in FIGS. 9A and 9B by the average velocity at the coolant outlet (15) of the central supply tube (3).

Figure 8A:
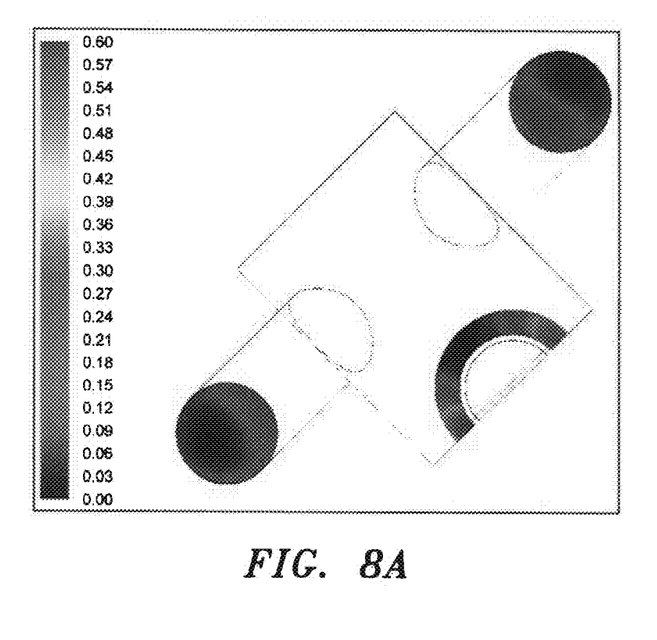
FIG. 8A and FIG. 8B are color computational fluid dynamics (CFD) simulations presenting contours of non-dimensional vertical velocity of the prior art heat removal unit and the claimed heat removal unit, respectively.
Figure 8B:
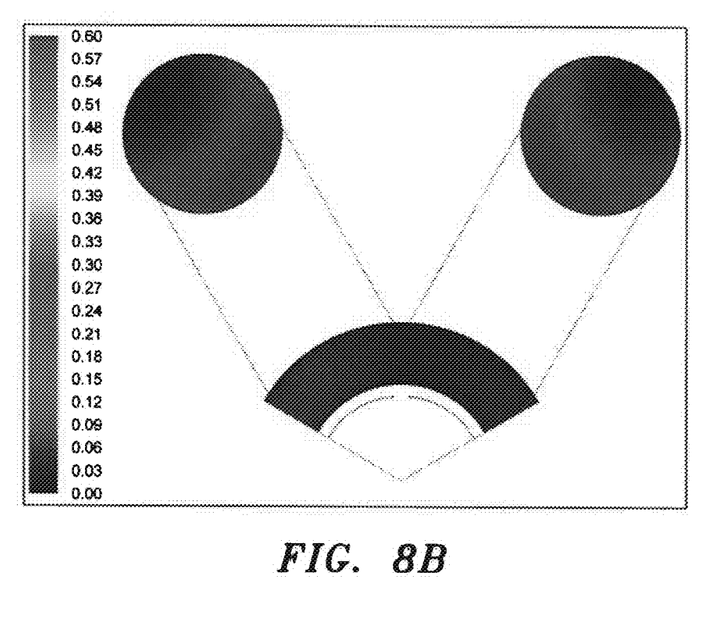

FIGS. 8A and 8B present contours of non-dimensional vertical velocity shown at the entrance of the straight sections of the external heat removal tubes and two central heat removal conduit. FIG. 8A is representative of the prior art heat removal unit and indicates there is a significant amount of swirl in the water flow inside the external heat removal tubes. Also, the vertical velocity contours show a higher degree of non-uniformity in the external heat removal tubes, and especially in the central heat removal conduit. FIG. 8B is representative of the presently claimed heat removal unit and indicates there is very little swirl present in the flow traveling upward in the external heat removal tubes. The vertical velocity contours at the inlet of the central heat removal conduit show a very good flow distribution. The non-dimensional vertical velocities were obtained by dividing the local vertical velocity by the average velocity of the central supply tube.

Figure 9A:
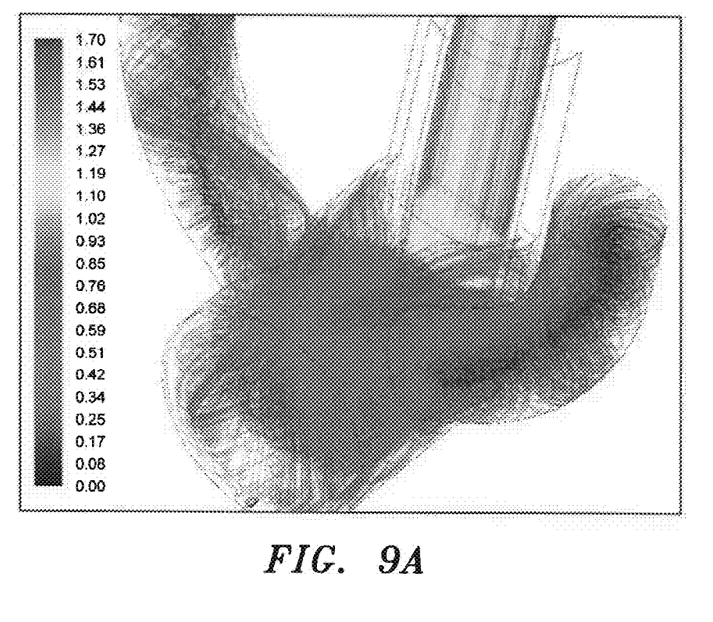
FIG. 9A and FIG. 9B are color computational fluid dynamics (CFD) simulations of a flow distribution comparison between the prior art heat removal unit and the claimed heat removal unit, respectively.
Figure 9B:
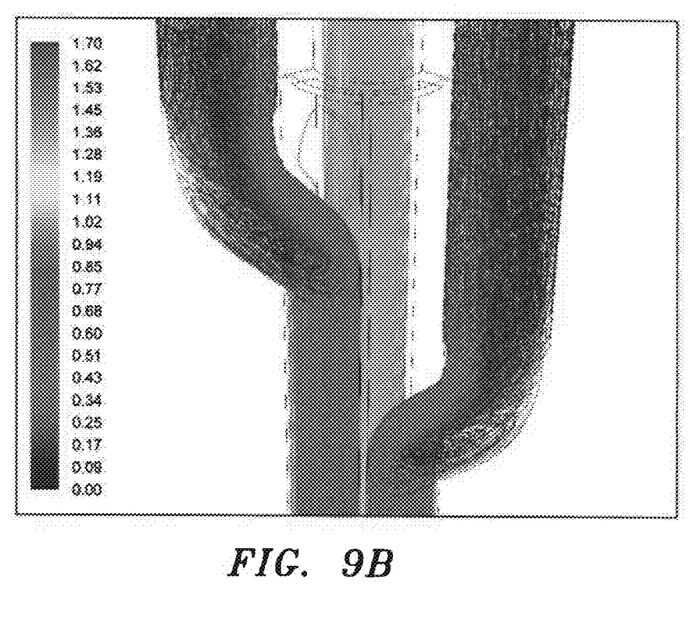

FIGS. 9A and 9B present pathlines of non-dimensional velocity magnitude representing the flow into the external heat removal tubes. FIG. 9A is representative of the prior art heat removal unit and presents flow pathlines through two external heat removal tubes. Due to the geometry of the bottom manifold in the prior art heat unit, the incoming, downward water flow is split in half and directed sideways in two opposite directions. This causes two major vortices, one in each half of the lower manifold, that propagate well into both of the external heat removal tubes. The vortex cores (or rotational flow) are visible along the centerlines of the tubes as shown by the dark blue pathlines. FIG. 9B is representative of the claimed heat removal unit and presents flow pathlines inside the conduit bottom area that indicate very little rotational or swirling action. There are only two notable regions of recirculating flow, one at the bottom of entrance region of each of the external heat removal tubes. However, the water flow traveling upward into the external heat removal tubes does not exhibit significant rotational or swirling action. The non-dimensional vertical velocities were obtained by dividing the local vertical velocity by the average velocity of the central supply tube.

Figure 10:
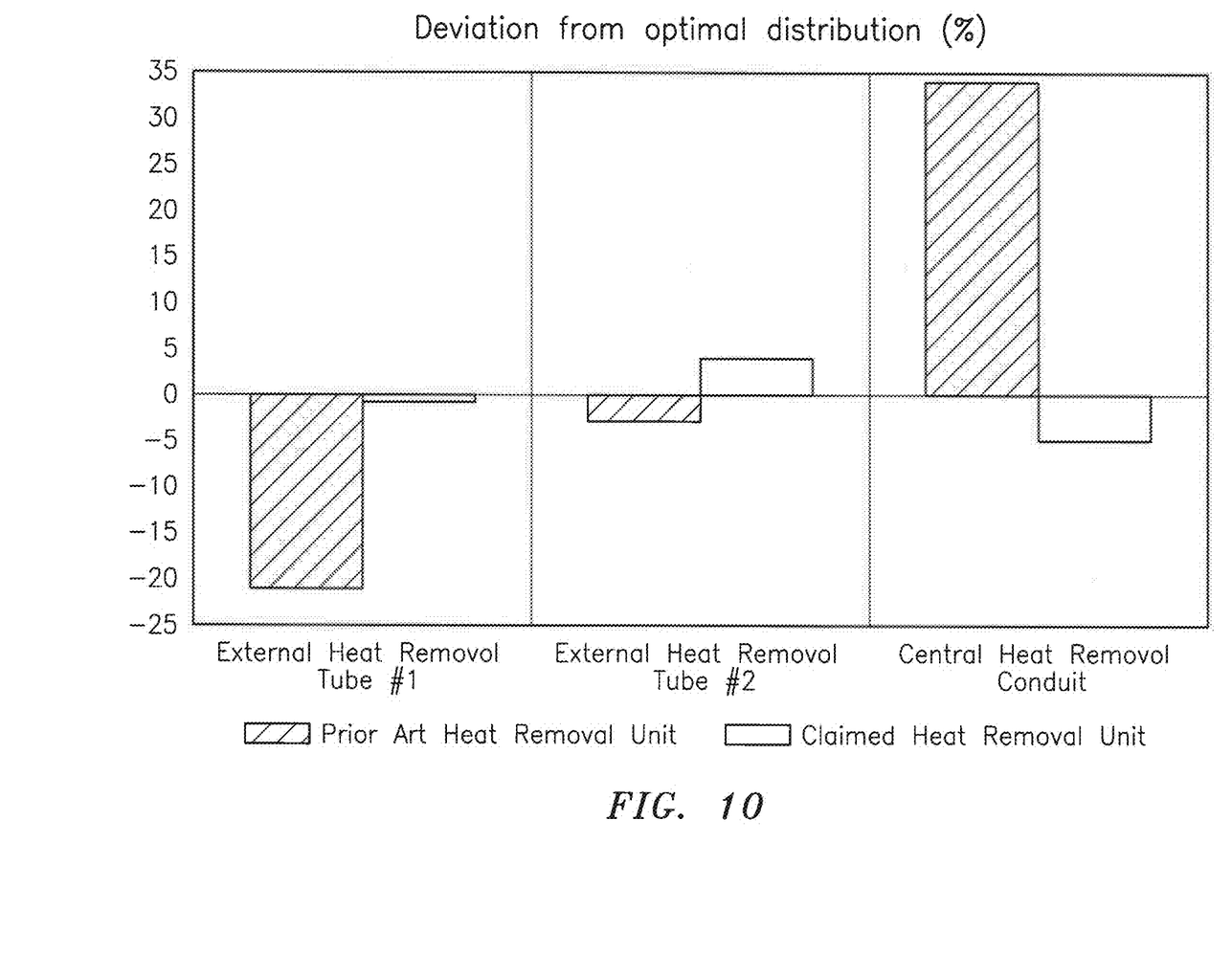
FIG. 10 is a graphical representation of a comparison of the flow distribution between a prior art heat removal unit of an external catalyst cooler vessel and a heat removal unit of an external catalyst cooler vessel disclosed herein.

FIG. 10 is a graphical representation of a comparison of the flow distribution between a prior art heat removal unit of an external catalyst cooler vessel and a heat removal unit of an external catalyst cooler vessel disclosed herein, based on the CFD results of FIGS. 8A, 8B, 9A, and 9B. The flow distribution comparison represents the deviation from optimal flow rate of each branch of the central heat removal conduit and the external heat removal tube based on wetted surface area as need for maximum heat removal. Thus, the CFD results indicate that the presently claimed heat removal unit provides a significant improvement in the flow distribution over the prior art design.

As described herein above, the external catalyst cooling vessel and method thereof having an excellent heat removal capacity in accordance with the present invention can be utilized to effectively, stably and flexibly control the operation temperature of fluid catalytic cracking (FCC) effected with heavy feedstock. Due to the use of a plurality of separate heat removal units each of which may be optionally opened and closed at any time, the apparatus and process thereof in accordance with the present invention can be flexibly regulated according to the requirements of different thermal energy removal loads.

It should be understood that the above provided general description and illustrative exemplification of the present invention would not constitute any limitation to the present invention in its broadest sense. In fact, the present invention could be adapted to cool any type fluid solid particles with some modifications which are of course within the extent of protection defined herein below.

What we claim:

1. An FCC external catalyst cooling vessel comprising:
   i) a substantially vertical, cylindrical catalyst cooler vessel having a vessel wall, at least one catalyst inlet and catalyst outlet, and at least one gas inlet and gas outlet;
   ii) at least one heat removal unit being housed in the catalyst cooler vessel, the at least one heat removal unit comprising a central supply tube sheathed in a coaxial manner by a central heat removal conduit to provide a flow area between the central supply tube and central heat removal conduit, the central supply tube and central heat removal conduit extend through a top portion of the vessel wall, the central supply tube having coolant inlet external to the vessel that is not sheathed by the central heat removal conduit and a coolant outlet at an end of the central supply tube that is opposite the coolant inlet and proximate to a bottom chamber of the central heat removal conduit, the central heat removal conduit having a vapor outlet external to the vessel and below the coolant inlet; and iii) the heat removal unit further comprising at least one external heat removal tube, the external heat removal tube being in fluid communication with the central heat removal conduit at a conduit bottom area proximate to the bottom chamber and above the central supply tube coolant outlet and a conduit top area distal to the bottom chamber of the heat removal unit and below the top portion of the vessel wall.

2. The catalyst cooling apparatus of claim 1, wherein the central supply tube comprises at least one vertical baffle that is proximate to the coolant outlet and extends along the central supply tube distal to the conduit bottom area.

3. The catalyst cooling apparatus of claim 2, wherein the central supply tube comprises a restriction that extends around the central supply tube, the restriction being a continuous ring piece or separate pieces, porous, perforated, solid or formed from a swaged portion of the central heat removal conduit or central supply tube and is integral to at least one vertical baffle.

4. The catalyst cooling apparatus of claim 1, wherein the heat removal unit comprises at least 3 external heat removal tubes that are substantially equally spaced axially about the central heat removal conduit.

5. The catalyst cooling apparatus of claim 1, wherein the at least one external heat removal tube interface in fluid communication with the central heat removal conduit at an angle of about 90 degrees or less.

6. The catalyst cooling apparatus of claim 1, wherein the at least 1 external heat removal tube interface in fluid communication with the central heat removal conduit at an angle of about 45 degrees or less.

7. The catalyst cooling apparatus of claim 4, wherein the at least 3 external heat removal tube interface in fluid communication with the central heat removal conduit at an angle of about 90 degrees or less.

8. The catalyst cooling apparatus of claim 4, wherein the at least 3 external heat removal tube interface in fluid communication with the central heat removal conduit at an angle of about 45 degrees or less.

9. The catalyst cooling apparatus of claim 1, wherein coolant inlet comprises a control valve and the vapor outlet comprises a control valve.

10. The catalyst cooling apparatus of claim 1, wherein the catalyst inlet and the catalyst outlet each comprise a control valve and the gas inlet and the gas outlet each comprise a control valve.

11. The catalyst cooling apparatus of claim 1, wherein the gas inlet is in fluid communication with a gas distributor located at an area with the vessel that is below the heat removal unit.

12. The catalyst cooling apparatus of claim 1, wherein the gas outlet extends through the top portion of the vessel wall.

* * * * *